(12) United States Patent
Baker

(10) Patent No.: US 7,035,921 B1
(45) Date of Patent: Apr. 25, 2006

(54) METHOD OF AND APPARATUS FOR PROVIDING WEB SERVICE USING A NETWORK OF SERVERS

(75) Inventor: Allen D. Baker, Garden Valley, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 699 days.

(21) Appl. No.: 09/713,089

(22) Filed: Nov. 14, 2000

(51) Int. Cl.
*G06F 15/173* (2006.01)

(52) U.S. Cl. .................. 709/224; 709/203; 709/218; 709/227; 709/232

(58) Field of Classification Search ............... 709/201, 709/203, 217, 223–228, 219, 218, 221, 229, 709/232, 239; 707/10
See application file for complete search history.

(56) References Cited

U.S. PATENT DOCUMENTS

| | | | | |
|---|---|---|---|---|
| 5,774,660 | A * | 6/1998 | Brendel et al. | 709/201 |
| 5,828,847 | A * | 10/1998 | Gehr et al. | 709/239 |
| 5,933,596 | A * | 8/1999 | Mayhew | 709/203 |
| 6,052,730 | A * | 4/2000 | Felciano et al. | 709/203 |
| 6,070,191 | A * | 5/2000 | Narendran et al. | 709/226 |
| 6,115,752 | A * | 9/2000 | Chauhan | 709/241 |
| 6,128,279 | A * | 10/2000 | O'Neil et al. | 370/229 |
| 6,175,869 | B1 * | 1/2001 | Ahuja et al. | 709/226 |
| 6,279,001 | B1 * | 8/2001 | DeBettencourt et al. | 709/221 |
| 6,327,622 | B1 * | 12/2001 | Jindal et al. | 709/228 |
| 6,389,448 | B1 * | 5/2002 | Primak et al. | 709/225 |

(Continued)

OTHER PUBLICATIONS

Bryhni, H. et al., 'A comparison of load balancing techniques for scalable Web servers', Jul./Aug. 2000 IEEE Network, vol. 14 issue 4 pp. 58-64.*
Castro, M. et al., 'Load balancing and control for distributed World Wide Web servers', 1999 IEEE International Conference on Control Applications, pp. 1614-1619 vol. 2.*

(Continued)

*Primary Examiner*—Ario Etienne
*Assistant Examiner*—Ramy M. Osman

(57) ABSTRACT

The invention includes a system and method that mediates access to a network of servers hosting a website. A central controller or server is the primary host for client requests, mapping the requests to the appropriate server by redirecting client web requests to the appropriate host server. The status of the server network is constantly monitored by the primary server by periodically "pinging" each of the servers in accordance with standard Internet Protocol (IP.) If a server becomes unavailable, the "down" status is recorded and future client requests for pages hosted by the down server are either immediately issued a user friendly error message or are redirected to an alternate web page on the primary host server or on another available server.

26 Claims, 4 Drawing Sheets

U.S. PATENT DOCUMENTS

| | | |
|---|---|---|
| 6,401,121 B1 * | 6/2002 | Yoshida et al. .............. 709/227 |
| 6,408,296 B1 * | 6/2002 | Acharya et al. ............ 709/218 |
| 6,557,038 B1 * | 4/2003 | Becker et al. .............. 709/227 |
| 6,578,078 B1 * | 6/2003 | Smith et al. ................ 709/224 |
| 6,671,259 B1 * | 12/2003 | He et al. ................... 709/229 |
| 6,754,706 B1 * | 6/2004 | Swildens et al. ........... 709/227 |
| 6,799,214 B1 * | 9/2004 | Li .............................. 709/219 |
| 6,826,624 B1 * | 11/2004 | Fell, Jr. ...................... 709/245 |
| 6,859,830 B1 * | 2/2005 | Ronneburg et al. ......... 709/224 |
| 6,865,605 B1 * | 3/2005 | Soderberg et al. .......... 709/229 |
| 2002/0112036 A1 * | 8/2002 | Bohannon et al. .......... 709/203 |

OTHER PUBLICATIONS

Chuck Semeria "Understanding IP Addressing: Everything you ever wanted to know", NSD Marketing, 3Com COrporation, Apr. 26, 1996.

* cited by examiner

METHOD OF AND APPARATUS FOR PROVIDING WEB SERVICE USING A NETWORK OF SERVERS

TECHNICAL FIELD

The invention is related to information servers and in particular to a network of web servers accessible via a central mediator providing redirecting of clients requesting access.

BACKGROUND

As illustrated in FIG. 1, a large web site, like that maintained by many large companies having a presence on the world wide web (www) of the Internet, is often implemented as a network of web pages distributed across multiple web servers. Typically, each web server is located on a separate machine. Each server and its associated set of pages is a sub-web site.

Generally, each sub-web provides a logically cohesive subset of the site's pages termed a "service". For example, one server may contain all the pages that make up a company's pre-sales information and that sub-web would be called the "pre-sales service". Another server may contain all the pages that make up the company's laser printer product support information and that sub-web would be called the "laser printer support service".

The idea that a site is composed of sub-webs can be applied recursively to a large site maintained by a company. Thus, the site may be composed of a pre-sales sub-web, an e-commerce sub-web, a product support sub-web and many others. The product support sub-web may, in turn, be composed of many sub-webs including a community forum sub-web, subscription service sub-web, trouble shooting trees sub-web, and others.

A problem with this multi-server site architecture is that the web pages have the names of the servers hardcoded in their HTTP links so that there is no convenient way to avoid bad links to an inoperative server. This is known as a "server down" problem since the referencing page includes links to one or more objects resident on an unavailable server. For example, referring to FIG. 1, the HTML for WebPageB might include the following elements:

<a href="http://WebServerA.hp.com/WebPageC.html">
Click Here To Visit Web Page C
</a>
<a href="http://WebServerB.hp.com/WebPageE.html">
Click Here To Visit Web Page E
</a>

If the browser user clicks on the "Click Here To Visit Web Page E" label, the browser connects to WebServerB.hp.com and asks it to deliver WebPageE.html. This works fine as long as WebServerB.hp.com is working. If WebServerB.hp.com has crashed, the browser cannot connect to it and will eventually time-out and display an error page like that shown in FIG. 2. The timeout typically takes an inordinate period of time (e.g., several minutes) and the error message received is considered by most users to be both unfriendly and uninformative.

Instead of allowing the browser to timeout and display its own error page, web site operators would like a solution that redirects the browser to a page on some other server that is available. Such a procedure would prevent the browser from delaying recognition of the problems and then, only after a timeout period has expired, displaying an unfriendly error message.

Accordingly, a need exists for a web access method and system in which failure of a server is handled gracefully, including the provision of user-friendly and informative error messages or some other useful information.

SUMMARY OF THE INVENTION

The present invention is directed to a system and method to detect a server failure and redirect client requests to avoid waiting for an unavailable server. The invention helps provide more user-friendly recovery information for addressing failed or otherwise unavailable servers.

The invention may be implemented in a system and method that mediates access to a network of servers hosting a website. A central controller or server is the primary host for client requests, mapping the requests to the appropriate server by redirecting client web requests to the appropriate host server. The status of the server network is constantly monitored by the primary server by periodically "pinging" each of the servers in accordance with standard Internet Protocol (IP.) If a server becomes unavailable, the "down" status is recorded and future client requests for pages hosted by the down server are either immediately issued a user-friendly error message or are redirected to an alternate web page on the primary host server or on another available server.

According to an aspect of the invention, the method of accessing information (e.g., web pages forming a web site) includes distributing information objects, such as the web pages, across a network of servers. A centralized database is maintained and updated indicating the status of each of the servers, e.g., operational or "down." Updating may including periodically sending a request to indicate status, e.g., "pinging" each of the servers to solicit an appropriate status response. Upon receipt of a request for one of the information objects, the centralized database is accessed to determine an availability of the server hosting the requested information object and a suitable response is sent, either redirecting the request to the host server if it is operational or sending an error message if the host server is unavailable. The error message may be another information object, e.g., a web page, including alternative information and/or links, or may directly redirect the user to alternative object.

According to another aspect of the invention, an information server system includes a network of servers, each hosting a different information object, typically in the form of one or more web pages. A centralized database stores the status condition of each of the servers. Requests for the information objects from remote clients are received by an appropriate communication interface, for example, to a local or wide area network (LAN or WAN) or via the Internet. A controller responds to the request and to the status of each of the servers to selectively redirect the request to one of the servers hosting the requested information object.

According to still another aspect of the invention, a method of providing a website includes storing the web pages comprising the website on a plurality of distinct web servers and maintaining a database indicating the operational status of each of the servers. A request from a remote client for one of the web pages initiates an inquiry to the database to determine if the server hosting the requested web page is operational. In response to an indication that the host server is operational, a response to the request is sent, the response redirecting the remote client to the host server. Alternatively, an indication that the host server is unavailable results in alternative processing to avoid that server.

The alternative processing may include sending an error message including alternative choices and/or redirecting the client to another server. In the case of redirection to an alternate server, a check may be made to verify that the selected alternate server is available.

The foregoing has outlined rather broadly the features and technical advantages of the present invention in order that the detailed description of the invention that follows may be better understood. It should be appreciated by those skilled in the art that the conception and specific embodimentd disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
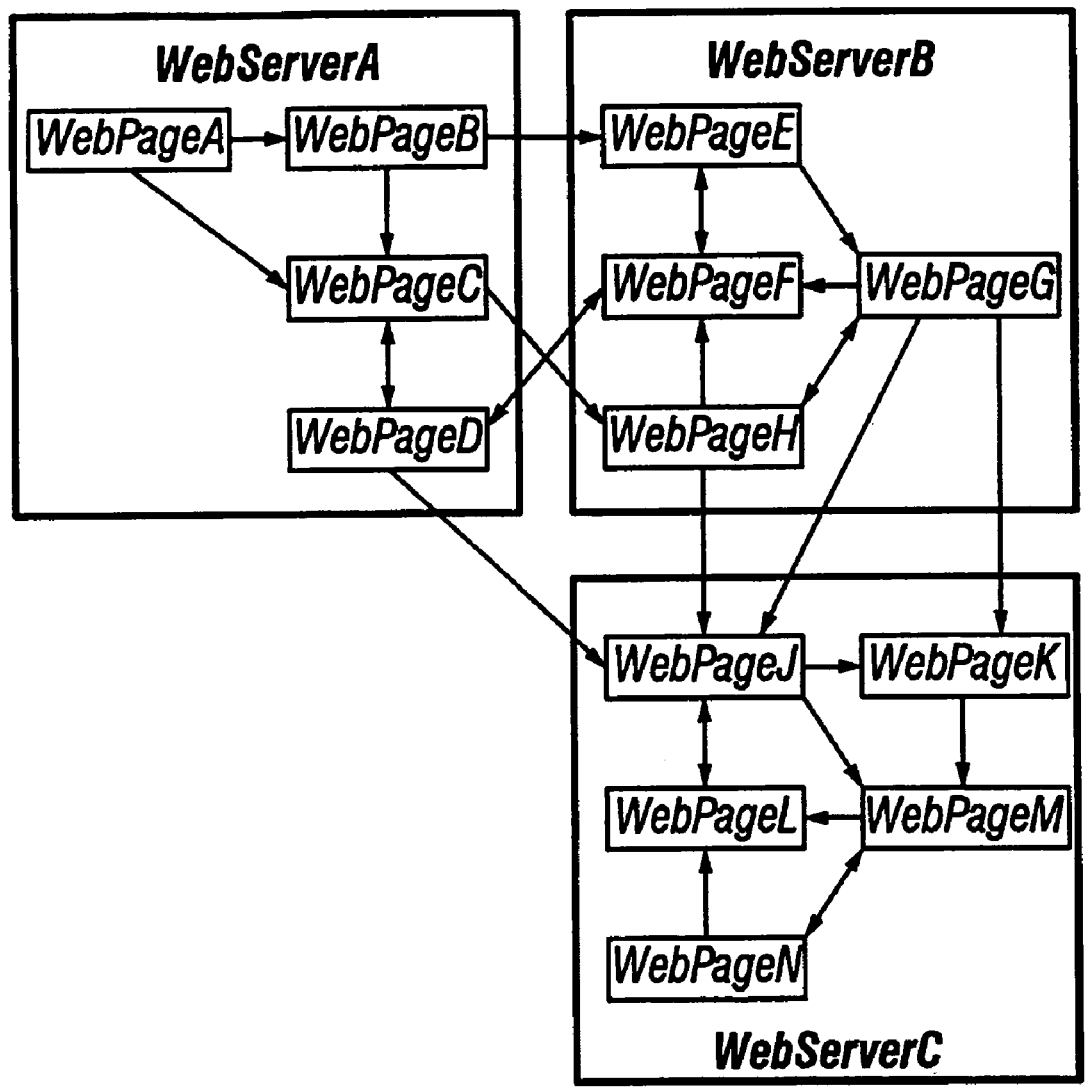
FIG. 1 is a diagram of an architecture of a typical large web site according to the prior art.
Figure 2:
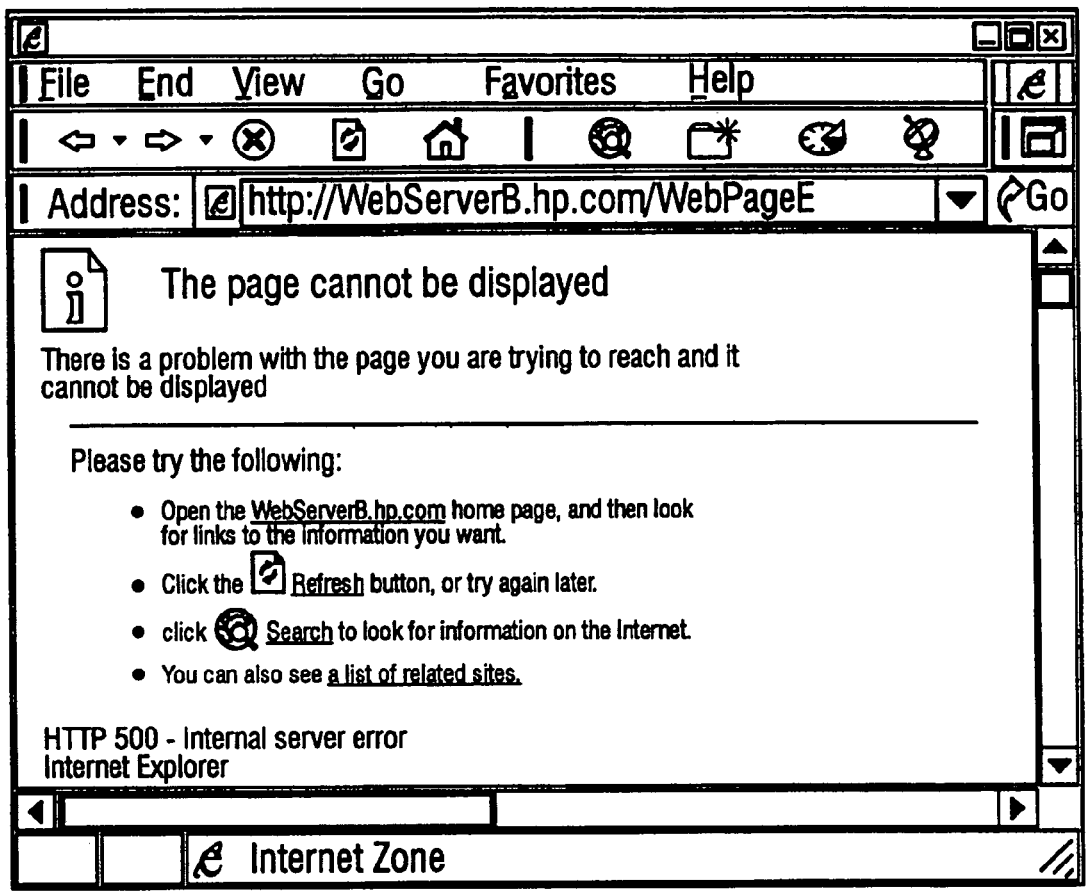
FIG. 2 is an illustrative computer display of an error message generated by an unreachable server according to the prior art.
Figure 3:
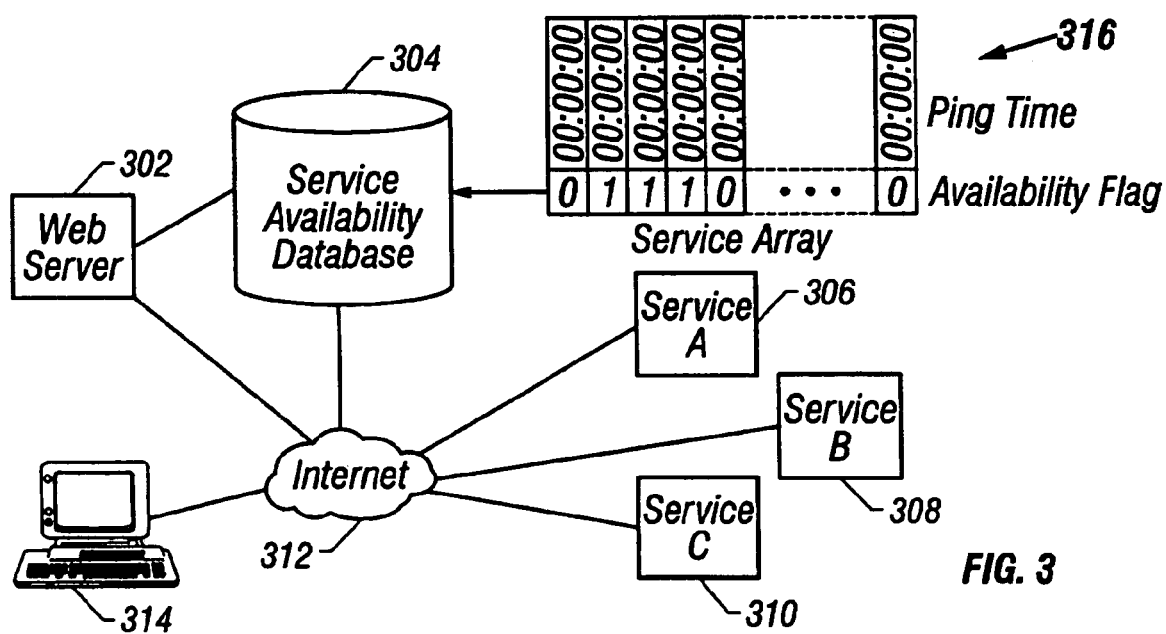
FIG. 3 is a simplified diagram of a server architecture according to one embodiment of the invention.

FIG. 3 is a block diagram of a website architecture implementing the invention. A primary WebServer 302 is the target site for all services supported by the server and is required to monitor the health and status of all supporting servers and map web page requests to the appropriate subordinate server when operational by redirecting web page requests to the appropriate subordinate server. Thus, WebServer 302 includes a service availability database 304 including the status of all servers required to implement the website. Service availability database 304 may also include the appropriate mappings for translating a given web page request to the appropriate subordinate server so that an appropriate redirection command may be issued to the requesting browser, assuming that the subject subordinate server is operational. An appropriate structure for a service array 316 is shown in FIG. 3, in which an availability flag is maintained for each of the subordinate servers together with a "ping time" indicating the time of the latest status update associated with each availability flag. WebServer 302 periodically requests a status update from each of the subordinate servers supporting services A, B and C (306, 308 and 310), each of the services in turn being supported by one or more subordinate servers. WebServer 302 is shown connected to services A, B and C via Internet 312, although any local or wide area network (LAN or WAN) may be used so long as it is compatible with redirection commands provided using standard Internet Protocol (IP).

A client 314 interfaces to Internet 312 via conventional means, including, for example, a modem and appropriate Internet Service Provider (ISP), etc.

Figure 4:
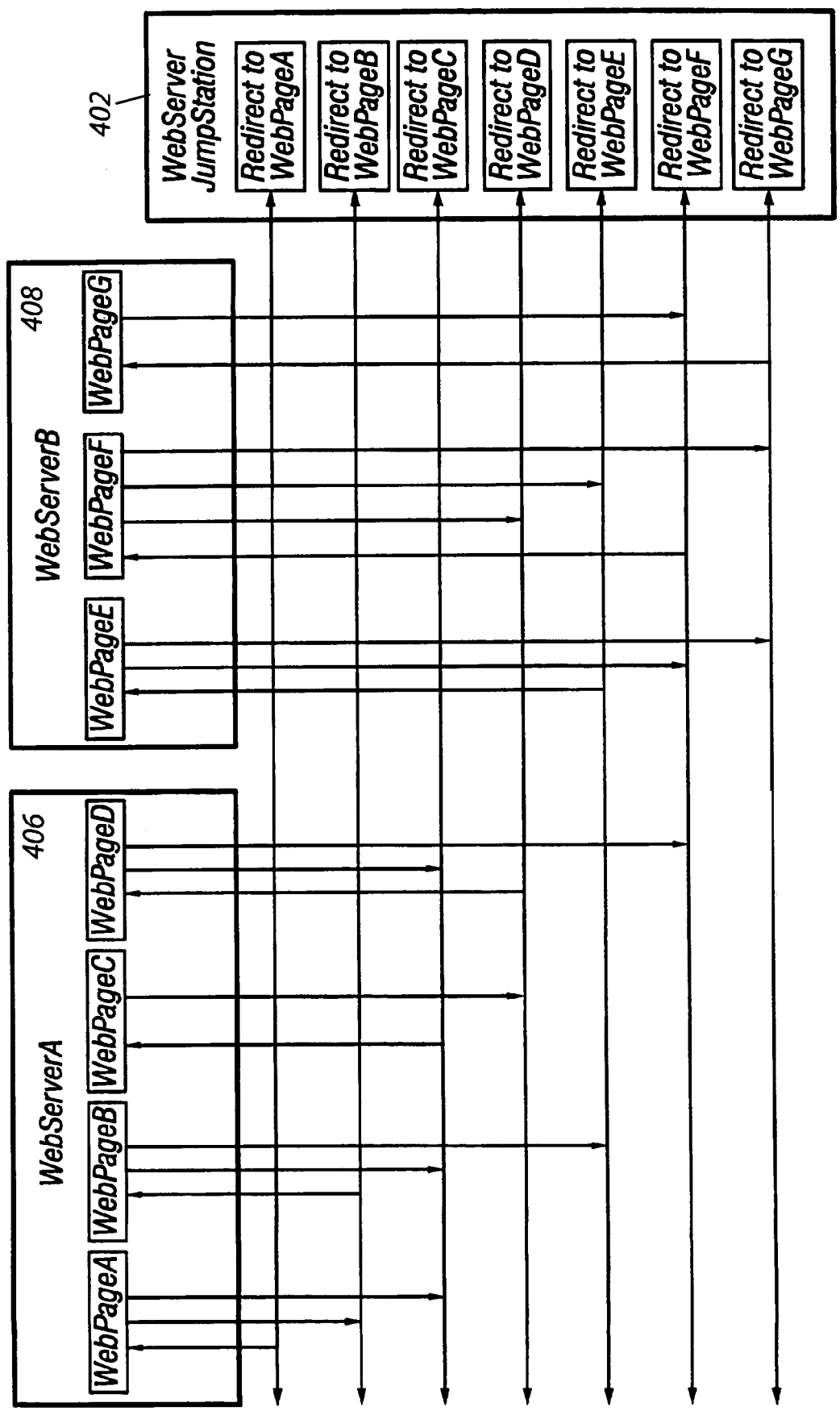
FIG. 4 is a block diagram of a Jump Station implementation of the invention.

A more detailed view of a configuration of servers adaptable to the present invention is presented in FIG. 4. Using a Jump Station architecture, page requests are first presented to WebServer Jump Station 402 for initial processing. If the hosting WebServer A 406 or WebServerB 408 is operational, then automatic redirection is initiated using the Jump Station architecture depicted. Thus, the Jump Station architecture uses a technique for centralizing access to all pages onto a single server. In this architecture, all pages link indirectly to other pages.

As an example, with reference to FIG. 4, instead of WebPageA linking directly to WebPageB, WebPageA links directly to a page on WebServerJumpStation (the page it links to is named "RedirectToWebPageB"). If WebServerA is still available, since it supplied WebPageA, then RedirectToWebPageB immediately redirects the browser to WebPageB using automatic redirection. Therefore, WebPageA would contain the following HTML:

```
<a    href="http://WebServerJumpStation.hp.com/Redirect-
    ToWebPageB.html">
Click Here To Visit Web Page B
</a>
```

And the entire content of RedirectToWebPageB would look like this:

```
<HTML>
    <HEAD>
        <TITLE>
            Auto Redirect To Web Page B
        </TITLE>
        <META HTTP-EQUIV="Refresh"
            CONTENT="0;URL=
            http://WebServerA.hp.com/WebPageB.html">
    </HEAD>
    <BODY>
    </BODY>
</HTML>
```

From the browser user's perspective, this looks exactly like linking directly to WebPageB. But in reality, when the browser user clicks on the "Click Here To Visit Web Page B" label in WebPageA, the user's browser links first to RedirectToWebPageB and then, immediately and automatically, links to WebPageB, which is then displayed in the user's browser window.

Figure 5:
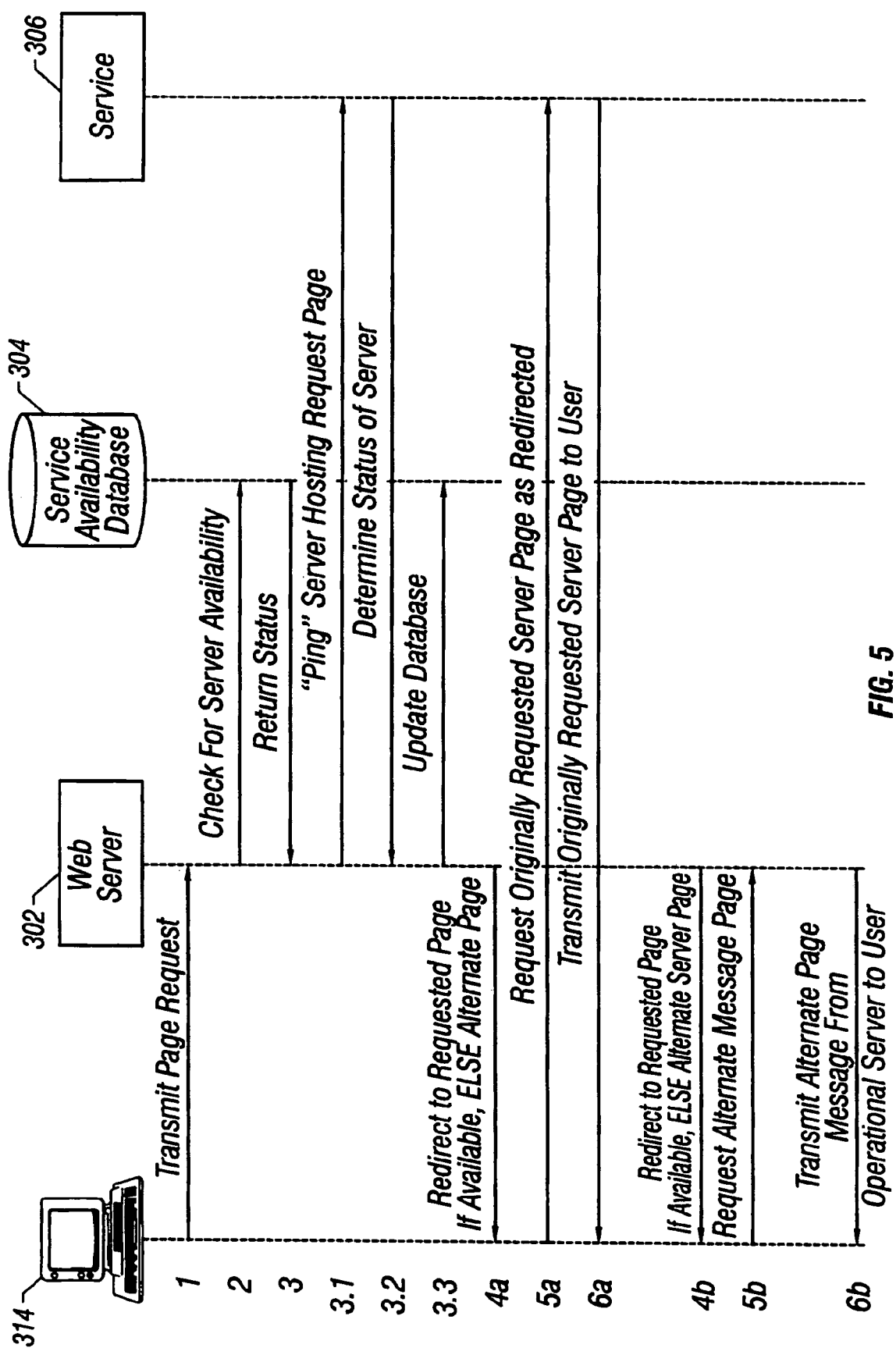
FIG. 5 is message flow for processing a client web page request using a Jump Station and redirection to bypass inaccessible or down servers.

FIG. 5 is a message flow for processing a client web page request using, for example, a Jump Station architecture in redirection to bypass an inaccessible or down server. At step 1 client terminal 314 transmits a page request to WebServer 302. In response, WebServer 302 checks service availability database 304 for the status of the server hosting the requested page. At step 3 the status of the host server is returned. If the status is missing or old, then, at step 3.1, the WebServer attempts to determine the status of service 306 by "pinging" the server hosting the requested page and, at step 3.2, determins the status of that server. Thus, the status may be determined to be operational or, if no response is received to the "ping", then a server "down" status is entered into service availability database 304 at step 3.3.

If the server hosting service 306 is operational, then a redirect command is sent by WebServer 302 to client terminal 314 directing client terminal 314 to request the originally requested page from service 306. Thus, at step 6A, service 306 returns the requested page to client terminal 114. Conversely, if the server hosting service 306 is down, then WebServer 302 directs client terminal 314 to an alternate server page. For example, this may include error recovery information or provide an alternate page of information. At step 5B, client terminal 314, in response to the redirection command issued at step 4B, requests the alternate message page, which, at step 6B, is returned to client terminal 314 by WebServer 302. Although the alternate page message is shown as originating from WebServer 302, it may originate from any other server that is determined to be operational by WebServer 302.

In summary, the present invention proactively solicits status information from a network of servers hosting the various services and pages comprising the website or multiple websites. Using a redirection technique such as implemented with a Jump Station architecture, a central server, e.g., WebServer Jump Station, is made the initial target for webpage requests, redirecting the request to appropriate hosting servers determined to be operational. Inoperable or otherwise unavailable servers are accommodated by inhibiting redirection to those servers, by redirecting requests to operational servers, including appropriate error messages or other alternative pages or error handling objects.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for supplying information, comprising:
   distributing a plurality of information web pages across a plurality of servers, wherein each information web page is hosted by a particular one of the servers and includes an indirect link to another information web page that is hosted by a different one of the servers, the indirect link being a link to a redirection web page for that other information web page and that redirection web page including an instruction to redirect a client terminal to that other information web page, the redirection web page being hosted by a web server jump station; and
   selectively serving a redirection web page for a particular information web page to a client terminal following a selection of an indirect link to the particular information web page and a determination that a server hosting the particular information web page is operational.

2. The method of claim 1, further comprising:
   presenting a first information web page of the plurality of information web pages to a client terminal;
   receiving a request from the client terminal for a second information web page of the plurality of information web pages, the request corresponding to a selection of the indirect link included in the first information web page;
   determining if the server hosting the second information web page is operational; and
   wherein selectively serving comprises, if the server hosting the second information web page is determined to be operational, returning to the client terminal the redirection web page for the second web page, the returned redirection web page including an instruction for redirecting the client terminal to the second information web page.

3. The method of claim 2, further comprising returning an error message to the client terminal if the server hosting the second information web page is determined to be unavailable.

4. The method of claim 3, wherein returning an error message includes directing the client terminal to an error handling object.

5. The method of claim 4, wherein the error handling object includes an error message.

6. The method of claim 4, wherein the error handling object includes a redirection command.

7. The method of claim 2, wherein determining comprises maintaining a centralized status of each server and inspecting the centralized status to determine the availability of the server hosting the second information web page.

8. The method of claim 7, wherein maintaining comprises periodically updating a status of each of the servers.

9. The method of claim 8, wherein updating includes pinging the servers.

10. The method of claim 1, further comprising providing a central server to host the redirection web pages, the central server being an initial target for requests made for each information web page.

11. An information server system comprising
    a plurality of servers, each hosting a different information web page;
    a redirection web page corresponding to each information web page, wherein each redirection web page includes an instruction to redirect a client terminal to the corresponding web page, wherein the redirection web pages are hosed by a web server jump station;
    wherein each information web page is hosted by a particular one of the servers and includes an indirect link to another information web page that is hosted by a different one of the servers, the indirect link being a link to a redirection web page for that other information web page; and
    the system further comprising a central server operable to receive a request for an information web page from a client terminal, determine if one of the plurality of servers hosting the requested information web page is operational, and to return a redirection web page corresponding to the requested information web page if the server hosting the requested information web page is determined to be operational.

12. The system of claim 11
    wherein each redirection web page is operable to cause the client terminal to request the information web page corresponding to that redirection web pane.

13. The system of claim 12:
    further comprising a centralized database storing a status of each of said servers; and
    wherein the central server is operable to access the centralized database to determine whether a selected one of the plurality of servers hosting information web pages is operational.

14. The system of claim 12, wherein the central server is operable to return an error message in response to the request of the information web page if the server hosting the requested information web page is determined not to be operational.

15. The system of claim 14, wherein the central server is operable to return an error message by directing the client terminal to an error handling web page.

16. The system of claim 15, wherein the error handling web page includes an error message.

17. The system of claim 15, wherein said error handling web page includes a redirection command.

18. The system of claim 13, wherein the central server is operable to maintain the central database by periodically updating a status of each of the plurality of servers that host the information web pages.

19. The system of claim 18, wherein updating includes pinging the servers.

20. The system of claim 11, wherein the central server hosts the redirection web pages.

21. A method of supplying a website, comprising the steps of:
   hosting a plurality of information web pages on a plurality of distinct web servers; and
   hosting a plurality of redirection web pages on a central web server;
   wherein each information web page is hosted by a particular one of the servers and includes an indirect link to another information web page that is hosted be a different one of the servers, the indirect link being a link to a redirection web page for that other information web page, wherein that redirection web page is hosted by a web server jump station and includes an instruction for redirecting a client terminal to that other information web page;
   the method further comprising selectively serving a redirection web page for a particular information web page to a client terminal following a selection of an indirect link to the particular information web page and a determination that a server hosting the particular information web page is operational.

22. The method of claim 21, further comprising:
   a first web server presenting a first information web page of the plurality of information web pages to a client terminal;
   receiving a request for a second information web page of the plurality of information web pages from the client terminal, the request corresponding to a selection of the indirect link included in the first information web page;
   determining if a second web server hosting the second information web page is operational; and
   returning, if the second web server is determined to be operational, to the client terminal the redirection web page for the second information web page, that redirection web page including an instruction for redirecting the client terminal to the second information web page.

23. The method of claim 22, further comprising returning an error message to the client terminal if the second web server is determined to be unavailable.

24. The method of claim 22, wherein determining comprises maintaining a centralized status of each web server and inspecting the centralized status to determine the availability of the second web server.

25. The method of claim 24, wherein maintaining comprises periodically updating a status of each of the web servers.

26. The method of claim 25, wherein updating includes pinging the servers.

\* \* \* \* \*

UNITED STATES PATENT AND TRADEMARK OFFICE
CERTIFICATE OF CORRECTION

PATENT NO. : 7,035,921 B1
APPLICATION NO. : 09/713089
DATED : April 25, 2006
INVENTOR(S) : Allen D. Baker Page 1 of 1

It is certified that error appears in the above-identified patent and that said Letters Patent is hereby corrected as shown below:

On the Title Page, Item (54), in "Title", line 2, delete "SERVICE" and insert -- SERVICES --, therefor.

In column 1, line 2, delete "SERVICE" and insert -- SERVICES --, therefor.

In column 6, line 58, in Claim 12, delete "pane" and insert -- page --, therefor.

Signed and Sealed this

Eleventh Day of August, 2009

David J. Kappos
*Director of the United States Patent and Trademark Office*